US012356533B2

(12) United States Patent
Khizar

(10) Patent No.: US 12,356,533 B2
(45) Date of Patent: Jul. 8, 2025

(54) TUNABLE NANOWIRES BLENDED RAPID HEATING PLATE

(71) Applicant: WHIRLPOOL CORPORATION, Benton Harbor, MI (US)

(72) Inventor: Muhammad Khizar, St. Joseph, MI (US)

(73) Assignee: Whirlpool Corporation

( * ) Notice: Subject to any disclaimer, the term of this patent is extended or adjusted under 35 U.S.C. 154(b) by 783 days.

(21) Appl. No.: 17/558,726

(22) Filed: Dec. 22, 2021

(65) Prior Publication Data

US 2023/0199921 A1 Jun. 22, 2023

(51) Int. Cl.
*H05B 6/64* (2006.01)
*H05B 6/80* (2006.01)

(52) U.S. Cl.
CPC ............. *H05B 6/6402* (2013.01); *H05B 6/80* (2013.01); *H05B 2206/04* (2013.01)

(58) Field of Classification Search
CPC ...... H05B 6/6402; H05B 6/80; H05B 6/6408; H05B 2206/04
USPC .................................................. 219/730, 756
See application file for complete search history.

(56) References Cited

U.S. PATENT DOCUMENTS 5,925,455 A * 7/1999 Bruzzone ............. H05B 6/6491 428/328
7,339,146 B2 * 3/2008 Aisenbrey ................ H05B 6/66 315/39.51
10,251,223 B2 * 4/2019 Linton ................. H05B 6/6494
2018/0057244 A1 * 3/2018 Boek ................... B01L 3/50851
2018/0220500 A1 * 8/2018 Staton ................. A47J 37/0623
2020/0163172 A1 * 5/2020 Khizar .................. B29C 70/882
2023/0079434 A1 * 3/2023 Khizar ................. H05B 6/6408 219/730

FOREIGN PATENT DOCUMENTS

EP 0 688 147 A1 12/1995
WO 2016/046666 A1 3/2016

OTHER PUBLICATIONS

Extended European Search Report for EP 22202032.3 dated May 2, 2023, 4 pages.

* cited by examiner

*Primary Examiner* — Eric S Stapleton
(74) *Attorney, Agent, or Firm* — Brooks Kushman P.C.

(57) ABSTRACT

A microwave heating appliance includes a housing having interior walls with interior surfaces defining a cooking chamber for heating food, a microwave heating source configured to generate microwave radiation for heating the food, and a rapid heating plate disposed in the cooking chamber. The rapid heating plate includes a substrate having a hybrid coating disposed on thereon, with the hybrid coating configured to generate heat upon application of a magnetic field and upon absorption of the microwave radiation from the microwave heating source. The hybrid coating includes ferromagnetic nanowires and ferritic carbon nanotubes dispersed in a polymer to generate heat for transferring to food placed on the rapid heating plate in the cooking chamber.

20 Claims, 1 Drawing Sheet

TUNABLE NANOWIRES BLENDED RAPID HEATING PLATE

TECHNICAL FIELD

The present application is directed to a rapid heating plate for a cooking appliance, and more particularly a coating for a rapid heating plate.

BACKGROUND

Ovens are heating appliances for food preparation having a housing defining a cavity forming a cooking chamber therein. Ovens include a heating mechanism for cooking food placed within the cooking chamber, with the heating mechanism being variable across different types of ovens. Common types of ovens include electric ovens (which include conduction/conventional and convection ovens), gas ovens, toaster ovens, and microwave ovens. The heating mechanisms vary across these ovens, with some including the heating mechanisms within the cooking chamber itself (e.g., conventional ovens), or in the housing (e.g., convection ovens and microwave ovens) such that energy or heat is transferred to the cooking chamber or the food. The heating mechanism in microwave ovens includes electromagnetic radiation via strong radio waves from devices such as magnetrons to heat the food itself.

Microwave ovens have been developed to include additional kinds of cooking capabilities, such as e.g. a crisping or browning function via a crisp plate, thereby enabling preparation of various types of food items and providing new culinary effects.

SUMMARY

According to one or more embodiments, A microwave heating appliance includes a housing having interior walls with interior surfaces defining a cooking chamber for heating food, a microwave heating source configured to generate microwave radiation for heating the food, and a rapid heating plate disposed in the cooking chamber. The rapid heating plate includes a substrate having a hybrid coating disposed on thereon, with the hybrid coating configured to generate heat upon application of a magnetic field and upon absorption of the microwave radiation from the microwave heating source. The hybrid coating includes ferromagnetic nanowires and ferritic carbon nanotubes dispersed in a polymer to generate heat for transferring to food placed on the rapid heating plate in the cooking chamber.

According to one or more embodiments, a rapid heating plate for a microwave heating appliance includes an aluminum substrate defining a surface for supporting food for heating thereon, and a hybrid coating disposed on the surface. The hybrid coating includes ferromagnetic nanowires and ferritic carbon nanotubes and configured to generate heat upon application of a magnetic field and upon absorption of the microwave radiation from a microwave heating source.

A method of forming a rapid heating plate for a microwave appliance includes mixing ferromagnetic nanowires with ferritic carbon nanotubes in a liquid polymer to form a hybrid nanocoating, and depositing the hybrid nanocoating on a substrate to form a rapid heating plate. The method further includes curing the rapid heating plate to form a coating having an initial heat ramp of up to 960 degrees C. per minute.

DETAILED DESCRIPTION

Figure 1:
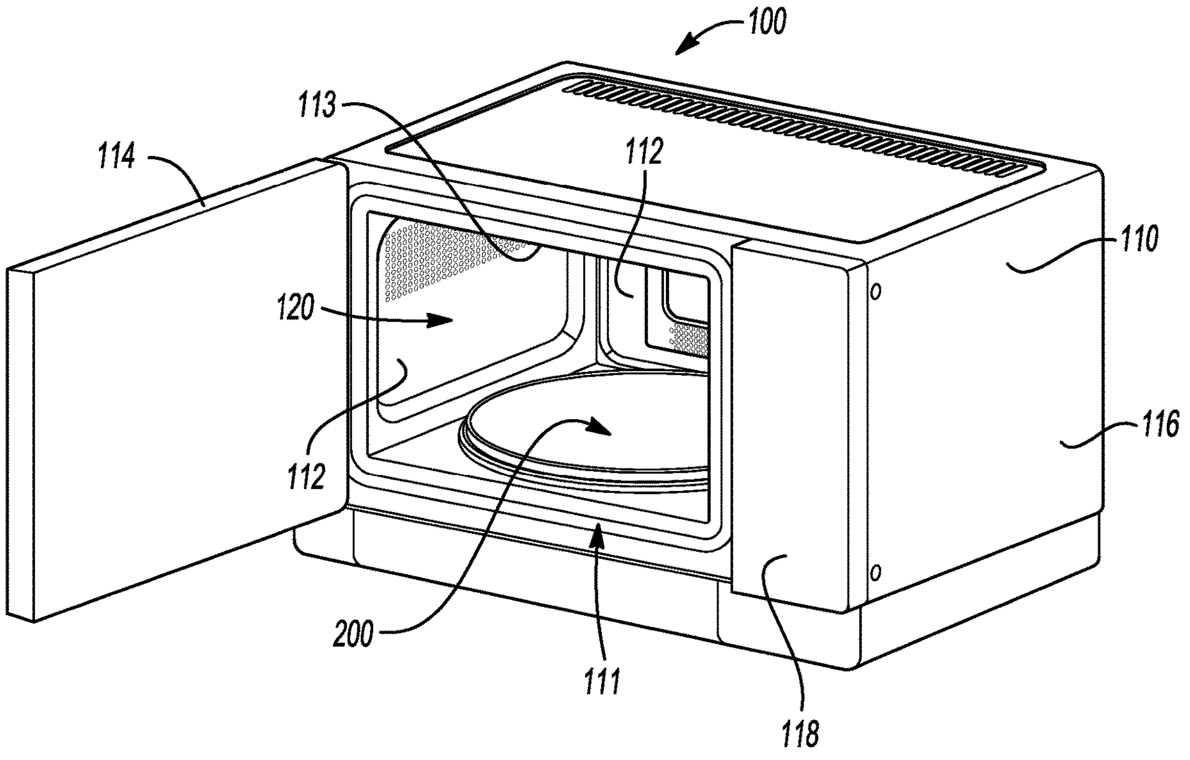
FIG. 1 is a schematic front view of a heating appliance (need to show a crisp plate in the cavity), according to an embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Conventional rapid heating plates (or, hereinafter interchangeably crisp plates) include ferrite coatings that have limited microwave absorption capability which results in inefficient and uneven heating. Limited microwave absorption capabilities may also result in microwave energy waste without generating any heat, which results in significant energy loss. Conventional crisp plates may include a high conductivity magnetic coating such as ferrite powder blended with pelletized silicon, however ferrite may result in limited microwave frequency activation, absorption, and have strict Curie temperature limitations, which may result to slow heating and poor heat spreading properties which in turn may affect the cooking of the food on the surface of the food contacting the crisp plate. The ferrite powder in pelletized silicon typically forms a thick coating (e.g., over 5 mm), and requires elaborate processing techniques to mix magnetic conductive materials with pelletized resins, resulting in air-voids and defects in the coating which form heat-traps resulting in loss of heat generation and effects uniformity of heat spread across the crisp plate. Moreover, coatings and ceramic plate materials may contribute to the microwave transparency of the crisp plate, leading to extra power loads to the microwave heating source to generate heat in the crisp plate to perform the same crisping function.

According to one or more embodiments, a heating appliance for cooking food, such as a microwave oven or a combination oven having at least a microwave heat source, includes a cooking chamber defined by cavity walls in a housing. A rapid heating plate is disposed within the cooking chamber to increase the browning or crisping of the food disposed on the rapid heating plate in the cooking chamber. The rapid heating plate generally acts as a bottom heater for the food by being energized via the microwave heat source. The rapid heating plate (or, interchangeably, crisp plate) has a rapid thermomagnetic heating coating thereon to enhance the crisping of the food in microwave ovens. The coating enhances the rapid heating performance (e.g, initial ramp up and maximum temperature) and uniformity of heat distribution in the rapid heating plate to improve cooking time and efficiency. The rapid heating plate includes a substrate material coated with one or more layers of a hybrid nanocoating which includes ferritic carbon nanotubes and ferromagnetic nanowires. Although high Curie temperature ferrite materials bended with ferritic carbon nanotubes and liquid polymers heating coatings are applicable for metallic plates, metallic plates are not suitable for microwave oven environments. As such, coatings for the rapid heating plate must be suitable for microwave environments. Discussion of the hybrid nanocoating for the rapid heating plate will be discussed below with reference to the Figures.

Referring to FIG. 1, a perspective view of a heating appliance 100 is shown, according to an embodiment. The heating appliance 100 is shown and described with reference to only the relevant general components, which is not intended to be limiting, as the heating appliance 100 includes other components and features for operation that are not shown or described herein but are expected as being included in the heating appliance 100. The heating appliance 100 includes a housing 110 with interior side walls 112, a base 111, and a ceiling 113 which cooperate to define a cooking chamber 120. The housing 110 also has an outer surface 116 exposed to the external environment. The heating appliance 100 includes a door 114 having an open position for providing access to the cooking chamber 120, and a closed position sealing the cooking chamber 120 from the external environment. The cooking chamber 120 is sized based on suitable sizes for kitchen appliances and for receiving food items to be cooked, and may include components for optimizing space and cooking of the food items, such as a turntable (not shown) or shelving racks (not shown). The heating appliance 100 may draw power from an external power source (not shown) such as an electrical plug and outlet connection. The heating appliance 100 may be connected to the power supply via any suitable power cable, and may include any other components such as, but not limited to, power inverters, transformers, voltage converters, etc., to supply the requisite power to features of the heating appliance 100. The input may be any suitable input based on the appliance 100. For example, the voltage input may be 120 V and the maximum power may be 1600 W.

The heating appliance 100 includes at least one heating mechanism (not shown) for cooking food placed within the cooking chamber 120. The heating mechanism is activated by user input at a control panel 118 located on the outer surface 116 (as shown in FIG. 1) or on the door 114 (not shown). The heating mechanism may be included within the housing 110 or within the cooking chamber 120, and is configured to heat food placed in the chamber 120. In embodiments where the heating mechanism is in the housing 110, the heating mechanism may be via microwave radiation directed to the cooking chamber 120 from any suitable microwave generating mechanism in the housing 110, such as, but not limited to, or one or more magnetrons or solid-state devices. Although the heating appliance 100 may be referred to as microwave oven 100, and a microwave oven is depicted in FIG. 1, this is not intended to be limiting and other types of heating appliances such as combination ovens that include a microwave generating mechanism for microwave heating along with another heating mechanism (e.g., electric coils and/or gas) are also contemplated as the heating appliance 100. As such, the heating appliance 100 may be any suitable domestic appliance for cooking food via microwave radiation, such as, but not limited to, microwave ovens, and microwave combination ovens with ovens, combination toaster ovens, and the like, such that the features described herein for the heating appliance 100 are suitable where microwaves are present within the cooking chamber 120 and used for heating the food placed therein. In the embodiment shown in FIG. 1, the heating appliance 100 is a microwave such that the heating mechanism may be a microwave generating device disposed in the housing 110 in any suitable manner, e.g., between the side walls 112, the ceiling 113, or the base 111 and the outer surface 116. The microwave radiation is generated by the microwave generating device and transmitted via any suitable mechanism, such as a waveguide, a coaxial cable or a strip line which supplies the microwave radiation to one or multiple feeding ports (as dependent on the design) which are open to the cooking chamber 120 to heat food placed therein.

Figure 2:
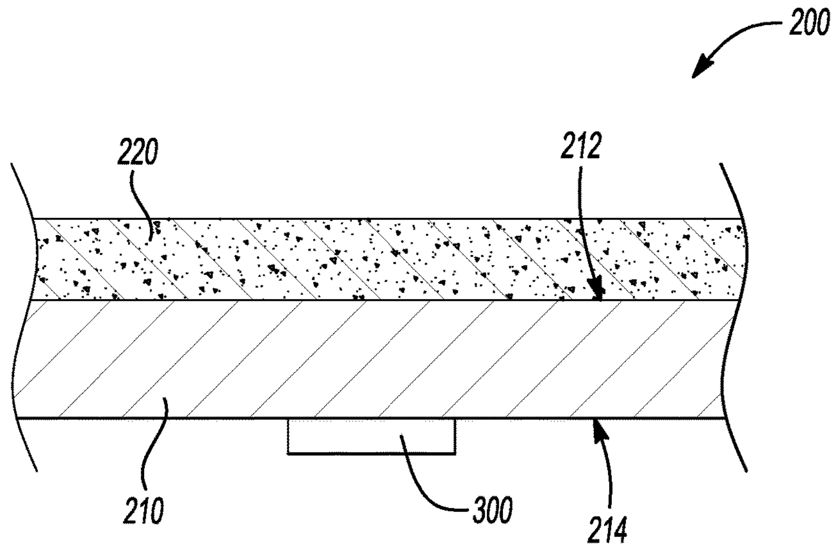
FIG. 2 is a schematic cross-section of a rapid heating plate for a heating appliance, according to an embodiment.

According to various embodiments, the heating appliance 100 includes a rapid heating plate 200 within the cooking chamber 120. The rapid heating plate 200 (or crisp plate 200) may be removable from the cooking chamber 120, and may be configured to be placed directly on the base 111, or on the surface of a tray or glass plate (not shown) that is on the base 111 within the cooking chamber 120. The rapid heating plate 200 is sized according to the cooking chamber 120, such that it can be inserted and removed by a user in instances where a crisping or browning function is desired. The rapid heating plate 200 has a substrate 210, having a top side 212 for supporting food thereon, and a bottom side 214. In one or more embodiments, the substrate 210 may be an aluminum material. In other embodiments, the substrate 210 may be a glass material, in which additional surface treatments may be used on the glass surface. The substrate 210 may, in some embodiments, be microwave transmissive to allow microwave radiation from the microwave heat source to pass therethrough. Furthermore, in certain embodiments, the substrate 210 may be heat conductive to facilitate heat spreading across the rapid heating plate 200. The bottom side 214 may, in certain embodiments as shown in FIG. 2, include one or more ceramic pads 300 to support the rapid heating plate 200 on the base 111 or tray/glass surface. The ceramic pads 300 may have any suitable thickness for raising the rapid heating plate 200 off the base 111 or tray/glass surface. For example, the ceramic pads 300 may have a thickness of 1 mm to 4 mm thick in some embodiments, 1.5 to 3.5 mm in other embodiments, and 2 to 3 mm in yet other embodiments.

Referring to FIG. 2, the rapid heating plate 200 includes at least one layer of a hybrid nanocoating 220 on the top side 212. Although only one layer 220 is shown, any suitable number of layers of the hybrid nanocoating 220 are contemplated, and a single layer is shown as an example in FIG. 2. Each layer may individually have a thickness of 0.5 to 2.5 mm, in some embodiments, 0.75 to 2.25 mm in other embodiments, and 1.0 to 2 mm in yet further embodiments. In other embodiments, the overall thickness of the layers collectively may be 0.5 to 2.5 mm, in some embodiments, 0.75 to 2.25 mm in other embodiments, and 1.0 to 2 mm in yet further embodiments. The hybrid nanocoating formulation including ferromagnetic nanowires blended with ferritic carbon nanotubes in a liquid polymer, which is disposed and cured on the top side 212 of the substrate 210, thus forming a hybrid coating of ferromagnetic nanowires and ferritic carbon nanotubes which enhances rapid heating and provides unique temperature tunability when the ferromagnetic nanowires and ferritic carbon nanotubes are exposed to microwaves operated at 2.45 GHz. The ferromagnetic nanowires and ferritic carbon nanotubes may each have an average size, as based on the average diameter, of 1 nm to 75 nm, in some embodiments, 1.5 to 60 nm in other embodiments, and 2 to 50 nm in yet further embodiments. The ferromagnetic nanowires, in some embodiments, are Co—Fe based ferromagnetic nanowires. The coating is loaded with a loading concentration of 0.05% to 0.25% by weight of ferritic carbon nanotubes, in some embodiments, 0.10 to 0.20% by weight in other embodiments, and 0.125 to 0.175% by weight in other embodiments. In at least one embodiment, the ferritic carbon nanotubes are a ferrite carbon nanotube material having a Curie Temperature of 310 to 330 degrees C. For example, in certain embodiments, the ferrite carbon nanotube material is a Ni—Cu ferritic carbon nanotube material. The coating is loaded with a loading concentration of 5 to 25% by weight of ferromagnetic nanowires, in some embodiments, 7.5 to 20% by weight in other embodiments, and 10 to 15% by weight in other embodiments. The liquid polymer may, in some embodiments, be liquid silicon, or, in other embodiments, be a two system based pre-polymerized liquid polymer.

The ferromagnetic nanowires and the ferritic carbon nanotube material of the hybrid nanocoating generate heat when placed in an alternating magnetic field. Moreover, the ferromagnetic nanowires exhibit microwave absorption to help limit heat localization effects. High saturation magnetization and magnetic anisotropy of the coating and the thermal conductivity afforded by the materials promote rapid and uniform heating across the rapid heating plate 200. For example, in microwaves operating at 2.45 GHz at 950W or by using an alternating magnetic field with H=23.95 kA/m and a frequency of 300 kHz, the rapid heating plate 200 has an initial heating ramp (i.e., an initial heating rate) of up to 960° C./min, in certain embodiments. In certain embodiments, the rapid heating plate 200 can achieve temperatures at least 250 degrees C. in 5 minutes, and in yet further embodiments, 260 degrees C. in 10 minutes.

According to one or more embodiments, a method of forming a rapid heating plate is provided. The method includes preparing a hybrid coating including ferromagnetic nanowires and ferritic carbon nanotubes in a liquid polymer, and depositing the coating on a substrate. The depositing may be in any suitable manner, including, but not limited to, spray coating, rolling, or other suitable deposition method. To use the rapid heating plate, the rapid heating plate is placed within a microwave oven cavity, with a food item to be heated thereon. Upon heating in a microwave environment, the ferritic carbon nanotubes with the ferromagnetic nanowires generate and distribute heat to perform a crisping function. As such, according to one or more embodiments, a rapid heating plate for a microwave heating appliance includes a hybrid nanocoating thereon which includes ferromagnetic nanowires, and a controlled loading concentration of ferritic carbon nanotubes blended in a liquid polymer. The hybrid nanocoating may include a CoFe-based ferromagnetic nanowires mixed with Ni—Cu ferrite carbon nanotube material. The limited loading of the ferritic carbon nanotubes with the ferromagnetic nanowires allows for heat generation and distribution across the coating and substrate for the crisping or browning function.

Except where otherwise expressly indicated, all numerical quantities in this disclosure are to be understood as modified by the word "about". The term "substantially," "generally," or "about" may be used herein and may modify a value or relative characteristic disclosed or claimed. In such instances, "substantially," "generally," or "about" may signify that the value or relative characteristic it modifies is within +0%, 0.1%, 0.5%, 1%, 2%, 3%, 4%, 5% or 10% of the value or relative characteristic (e.g., with respect to transparency as measured by opacity). Practice within the numerical limits stated is generally preferred. Also, unless expressly stated to the contrary, the description of a group or class of materials by suitable or preferred for a given purpose in connection with the disclosure implies that mixtures of any two or more members of the group or class may be equally suitable or preferred.

As referenced in the figures, the same reference numerals may be used herein to refer to the same parameters and components or their similar modifications and alternatives. For purposes of description herein, the terms "upper," "lower," "right," "left," "rear," "front," "vertical," "horizontal," and derivatives thereof shall relate to the present disclosure as oriented in FIG. 1. However, it is to be understood that the present disclosure may assume various alternative orientations, except where expressly specified to the contrary. It is also to be understood that the specific devices and processes illustrated in the drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. The drawings referenced herein are schematic and associated views thereof are not necessarily drawn to scale.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A microwave heating appliance comprising:

a housing having interior walls with interior surfaces defining a cooking chamber for heating food;

a microwave heating source configured to generate microwave radiation for heating the food; and a rapid heating plate disposed in the cooking chamber, the rapid heating plate including a substrate having a hybrid coating disposed on thereon, the hybrid coating configured to generate heat upon application of a magnetic field and upon absorption of the microwave radiation from the microwave heating source, wherein the hybrid coating includes ferromagnetic nanowires and ferritic carbon nanotubes dispersed in a polymer to generate heat for transferring to food placed on the rapid heating plate in the cooking chamber.

2. The microwave heating appliance of claim 1, wherein the ferritic carbon nanotubes are a Ni—Cu ferritic carbon nanotube material.

3. The microwave heating appliance of claim 2, wherein the ferritic carbon nanotubes have an average diameter of 1 to 75 nm.

4. The microwave heating appliance of claim 1, wherein the ferromagnetic nanowires are a Co—Fe based ferromagnetic nanowires.

5. The microwave heating appliance of claim 1, wherein the hybrid coating has an initial heating ramp of up to 960 degrees C./min.

6. The microwave heating appliance of claim 1, wherein the polymer is silicon.

7. The microwave heating appliance of claim 1, wherein the ferritic carbon nanotubes are loaded as 0.05 to 0.25% by weight of the coating.

8. The microwave heating appliance of claim 1, wherein the hybrid coating has an overall thickness of 0.5 to 2.5 mm.

9. The microwave heating appliance of claim 1, wherein the rapid heating plate reaches 250 degrees in 5 minutes when exposed to 950 W.

10. A rapid heating plate for a microwave heating appliance, the rapid heating plate comprising:

an aluminum substrate defining a surface for supporting food for heating thereon; and a hybrid coating disposed on the surface, the hybrid coating including ferromagnetic nanowires and ferritic carbon nanotubes and configured to generate heat upon application of a magnetic field and upon absorption of microwave radiation from a microwave heating source.

11. The rapid heating plate of claim 10, wherein the hybrid coating has an overall thickness of 0.5 to 2.5 mm.

12. The rapid heating plate of claim 10, wherein the ferritic carbon nanotubes are 0.05 to 0.25% by weight of the hybrid nanocoating.

13. The rapid heating plate of claim 10, wherein the ferritic carbon nanotubes are a Ni—Cu ferrite carbon nanotube material.

14. The rapid heating plate of claim 10, wherein the rapid heating plate reaches 250 degrees in 5 minutes when exposed to 950 W.

15. The rapid heating plate of claim 10, wherein the ferritic carbon nanotubes have an average diameter of 1 to 75 nm.

16. The rapid heating plate of claim 10, wherein the ferromagnetic nanowires are a Co—Fe based ferromagnetic nanowires.

17. A method of forming a rapid heating plate for a microwave appliance, the method comprising:

mixing ferromagnetic nanowires with ferritic carbon nanotubes in a liquid polymer to form a hybrid nanocoating;

depositing the hybrid nanocoating on a substrate to form a rapid heating plate; and curing the rapid heating plate to form a coating having an initial heat ramp of up to 960 degrees C. per minute.

18. The method of claim 17, wherein the ferritic carbon nanotubes are a Ni—Cu ferrite carbon nanotube material.

19. The method of claim 18, wherein the ferritic carbon nanotubes are 0.05 to 0.25% by weight of the hybrid nanocoating.

20. The method of claim 17, wherein the liquid polymer is liquid silicon.

* * * * *